July 18, 1967  E. T. VENEMARK  3,331,732
METHOD OF REMOVING HYDROGEN SULFIDE FROM AN
AQUEOUS SOLUTION OF ALKALI SULFIDE
Filed Dec. 13, 1963  2 Sheets-Sheet 2

United States Patent Office 3,331,732
Patented July 18, 1967

3,331,732
METHOD OF REMOVING HYDROGEN SULFIDE FROM AN AQUEOUS SOLUTION OF ALKALI SULFIDE
Emil Teodor Venemark, deceased, late of Ornskoldsvik, Sweden, by Rut Venemark, legal representative, Malmo, Sweden, assignor to Mo och Domsjö Aktiebolag, Ornskoldsvik, Sweden, a limited company of Sweden
Filed Dec. 13, 1963, Ser. No. 330,499
Claims priority, application Sweden, Dec. 17, 1962, 13,593/62
6 Claims. (Cl. 162—30)

The present invention relates to cellulose manufacture by the sulfate method and is more particularly concerned with a process in the preparation of a polysulfide-containing cooking liquor.

In the manufacture of cellulose pulp by the sulfate method, it is for economical reasons necessary to recover the alkali from the spent liquor. When cooking with a high proportion of polysulfide in the cooking liquor, which involves great advantages, it is necessary to remove in one way or another a portion of the sulfide of the circulating liquor so that a portion of the sodium sulfide obtained by combustion of the black liquor is converted into free sulfur, which is reused for making sodium polysulfide. In the digestion, a major portion of the polysulfide sulfur is converted into sulfide and thiosulfate and is recovered, apart from any losses, mainly as sulfide in the melt resulting from the combustion of the evaporated residual black liquor.

In the recovery process, it has been found suitable to work up the green liquor, i.e. the solution of sodium sulfide, sodium carbonate and minor amounts of other sodium salts, obtained by dissolving the melt from the combustion of the black liquor. One possible method consists in introducing carbon dioxide into the green liquor, whereby hydrogen sulfide is obtained, which is subsequently converted into sulfur. Even if the green liquor worked up has previously been enriched on sulfide, a great amount of carbon dioxide is consumed for driving off hydrogen sulfide. A part thereof is consumed to convert the carbonate and the sulfide of the solution into sodium hydrogen carbonate and sodium hydrogen sulfide. If suitable equipment is used, this conversion can be carried very far without any hydrogen sulfide leaving the solution. In the reaction it has been found highly advantageous to use a carbon dioxide gas having a high content of carbon dioxide and obtainable at low cost. The oxygen content of the carbon dioxide gas should also be as low as possible, since sulfide solutions are readily oxidized by oxygen, and this takes place at a rate which becomes higher as the alkalinity of the solution becomes lower.

The process of the present invention comprises using, as the carbon dioxide containing gas for treating the green liquor, a gas obtained from a combustion process in which the chemical reaction is such that the carbon dioxide is partly formed without the dilution caused by the nitrogen of air. Such gases can be obtained by using a flue gas from a lime kiln or a flue gas from the combustion of black liquor; in the latter case a simultaneous reduction of sodium sulfate is carried out using a deficit of oxidizing agent so that the sulfate is reduced to form sulfide. The reaction between the carbon dioxide containing gas and the green liquor can be carried out wholly or partly under superatmospheric pressure, for example, within the range from about 0.1 to about 25 kg./sq. cm., and the equipment can be selected so that any precipitation of sodium hydrogen carbonate does not cause any inconvenience.

When a carbon dioxide containing gas derived from the combustion of black liquor is used, the invention may be carried out by burning oil or a combustible gas in the flue gas obtained from the combustion of the black liquor, using an addition of air so small that the oxygen of the added air as well as that of the flue gas are practically completely consumed. Preferably, the flue gas obtained should contain less than 1% of oxygen. Such a combustion procedure, if a waste hydrogen gas, e.g. from an electrolytic installation, is available, can be carried out catalytically.

As the carbon dioxide containing gas to be used in the process of this invention, it is also possible to make use of flue gases from a process which can without appreciable sacrifice be carried out without excess air, such as e.g. the flue gas from the burning of lime. Lime burning apparatus are present in most sulfate cellulose factories for the chemical recovery. In this case the flue gas obtained should also contain less than 1% of oxygen. Experiments made in accordance with this invention have shown that a rotary furnace for re-burning of calcium carbonate mud (lime mud) can be operated without obtaining a detectable oxygen content in the flue gas, as determined by an Orsat apparatus, at a fuel consumption which is not more than 5% above that at optimum combustion.

FIGURE 1 is a flow sheet depicting apparatus for removing hydrogen sulfide from green liquor obtained in the sulfate pulping method and thereafter converting the hydrogen sulfide to sulfur for subsequent use in preparing polysulfide containing cooking liquor for use in the sulfate method of preparing cellulose pulp, in accordance with the instant invention, as carried out in Example 1, and a description thereof will be found in that example.

The invention is illustrated but not limited by the following examples. In the examples as well as elsewhere in the specification and claims, all gas compositions are expressed in percent by volume.

*Example 1*

Figure 1:
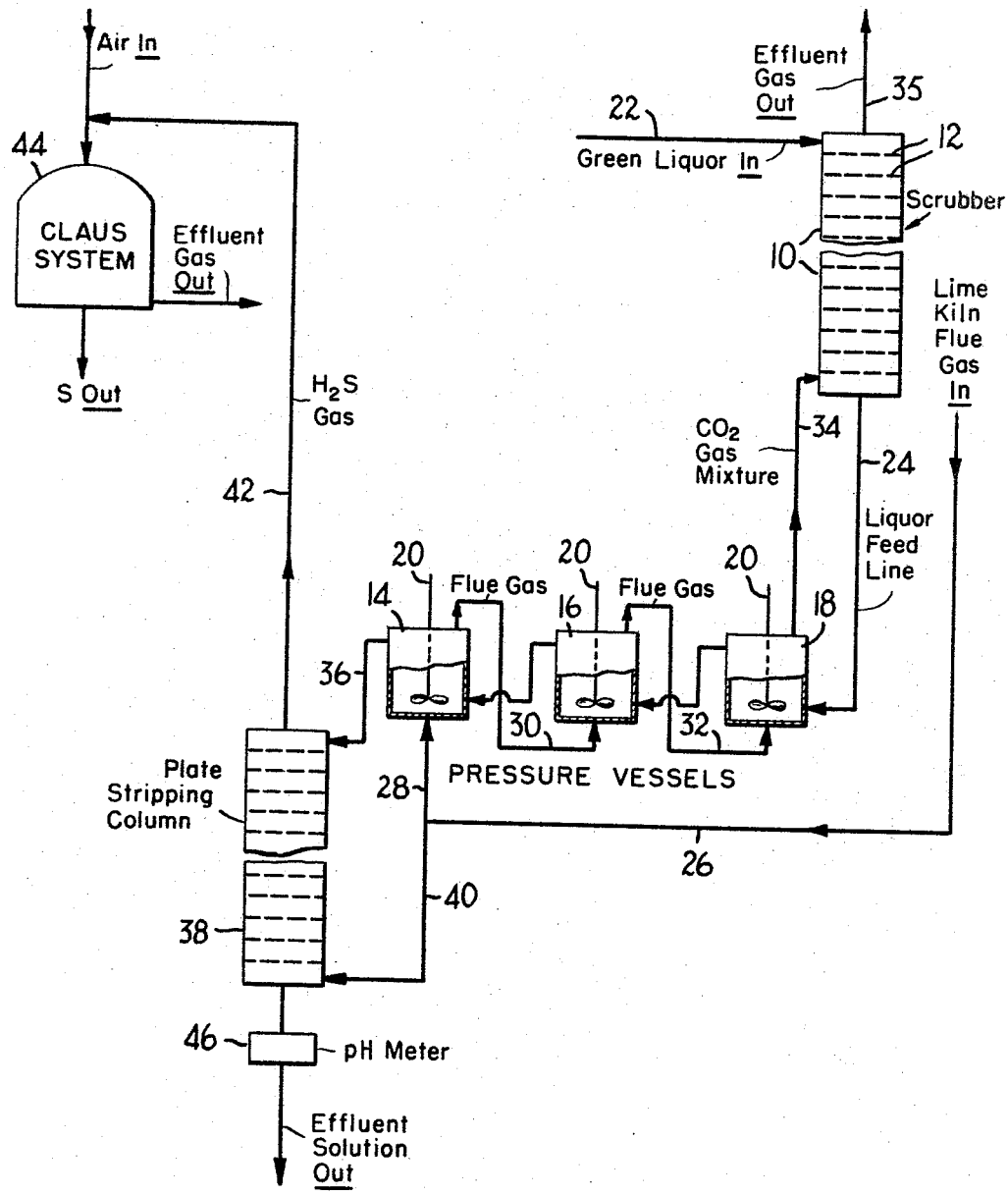

Experiments were made in a commercial plant producing 20 metric tons of sulfate pulp per hour cooked with a liquor containing 70 kg. of polysulfide sulfur per metric ton of pulp. A flow sheet showing the apparatus used in removing hydrogen sulfide from the green liquor produced and thereafter converting it to sulfur is given in FIGURE 1.

For the reaction between green liquor and flue gas, there were used a scrubber 10 having several theoretical plates 12 and three pressure vessels 14, 16 and 18 connected in series, of a capacity of 25 cubic meters and each having an agitator 20. To the top of the scrubber via line 22, green liquor was passed at a rate of 0.8 cubic meter per minute, said green liquor containing, per liter, 60 g. $Na_2O$ as sodium sulfide, 60 g. $Na_2O$ as sodium carbonate and 10 g. $Na_2O$ as other sodium salts, such as sulfate, chloride, thiosulfate and others. The green liquor had a temperature of 80° C. and had been clarified to remove sludge in the usual manner. The green liquor was allowed to flow from the scrubber through line 24 through the three vessels in series. Into the vessel 14 where the solution left the treatment, 120 cubic meters per minute of flue gas (calculated as dry gas at 760 mm. mercury and 0° C.) were introduced via lines 26 and 28 in a finely divided state, said flue gas being derived from a lime kiln operated without excess air. The lime kiln gas contained about 30% of carbon dioxide, about 1% of uncombusted, and 69% nitrogen and no oxygen detectable by an Orsat apparatus, and had been freed of dust and the major portion of its moisture and sulfur dioxide content by washing in a scrubber. Its temperature was 50° C. From the vessel 14 where the solution left the treatment, the flue gas was passed through the other two vessels 16 and 18 in countercurrent to the liquid, whereupon it was passed through the scrubber 10 via line 34. The pressure in the vessel into which the flue gas was introduced, was 1 kg. per sq. cm. above atmospheric and in the following two vessels, the pressures were 0.6 and 0.2 kg. per sq. cm. above atmospheric, respectively, while the top of the scrubber was in free communication with the ambient atmosphere. The effluent gas leaving the top of the scrubber 10 via line 35 contained about 2% of carbon dioxide and was practically free from hydrogen sulfide, due to the fact that the alkaline green liquor absorbs hydrogen sulfide substantially more rapidly than carbon dioxide. The effluent solution contained sodium hydrogen sulfide and sodium hydrogen carbonate (80 g./l.), and sodium carbonate (40 g./l.) together with these salts which were indifferent to the treatment, (sodium salts such as sulfates and chlorides (10 g./l.) and thiosulfate (2 g./l.)) and was transferred via line 36 to a plate column 38 of 25 plates and treated with 80 cubic meters of flue gas per minute from the above lime furnace via lines 26 and 40, whereby the sulfur of the solution was liberated as hydrogen sulfide and transferred via line 42 to a Claus system 44 to form elemental sulfur. To prevent hydrogen sulfide from leaving in the initial carbon dioxide treatment on account of any disturbances in the supply of liquor to the scrubber, a pH meter 46 was provided in the effluent solution to control the supply of flue gas to the scrubber. Thereby, the rate of flue gas supply could be empirically adjusted so that the effluent flue gas was devoid of hydrogen sulfide irrespective of load variations and the momentary operating conditions and state of the scrubber.

Example 2

Experiments were carried out in a commercial plant producing 10 metric tons of sulfate pulp per hour cooked with a liquor containing 70 kg. of polysulfide sulfur per metric ton of pulp.

Figure 2:
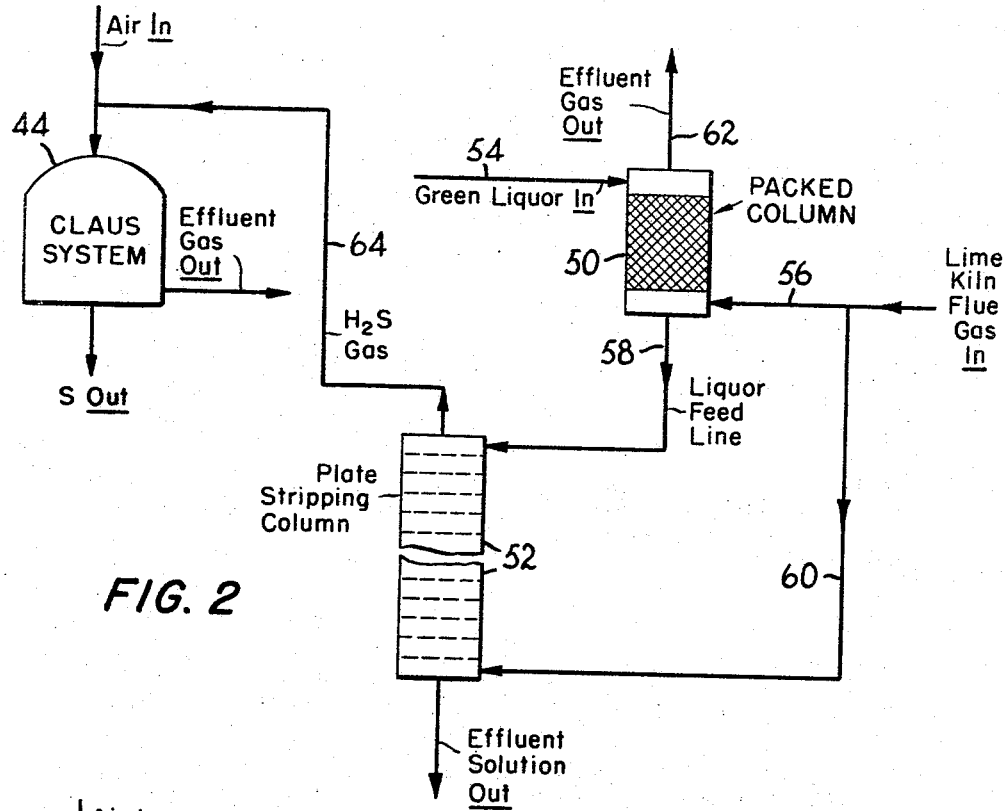
FIGURE 2 is a flow sheet of a second embodiment of the invention, as carried out in Example 2, and a description thereof will be found in that example.

A flow sheet showing the apparatus employed in removing hydrogen sulfide from the green liquor produced and thereafter converting it to sulfur is given in FIGURE 2. For the reaction between green liquor and flue gas, a packed column 50 was provided having a height of 6 meters and a diameter of 2.2 meters together with a plate column 52 having 30 plates and a diameter of 2.4 meters. Into the top of the packed column via line 54, there was introduced 0.4 cubic meter of green liquor per minute, containing, per liter, 60 g. $Na_2O$ as sodium sulfide, 60 g. $Na_2O$ as sodium carbonate and 10 g. $Na_2O$ as other sodium salts such as sulfate, chloride, thiosulfate and others. The green liquor had a temperature of 80° C. and had been treated in the usual manner to separate sludge therefrom. Into the bottom of the packed column, 60 cubic meters (calculated as dry gas at 760 mm. mercury and 0° C.) of flue gas were introduced per minute via line 56, said flue gas being taken from a lime kiln operated without excess of air. The lime kiln gas contained about 30% carbon dioxide, 1% uncombusted and 69% nitrogen, and no oxygen detectable by an Orsat apparatus. The gas had been washed in a scrubber to remove dust and the major portion of its water and sulfur dioxide content. Its temperature was 60° C. The carbonated green liquor was transferred from the lower portion of the packed column via line 58 to the top plate of the bell plate column 52, where stripping of hydrogen sulfide was started. Into the lower portion of the bell plate column, 40 cubic meters of flue gas were introduced per minute (calculated as dry gas at 760 mm. mercury and 0° C.) via line 60 from the same lime kiln as referred to above.

The gas leaving the top of the packed column via line 62 contained about 7% of carbon dioxide, but was practically devoid of hydrogen sulfide, due to the alkaline green liquor absorbing hydrogen sulfide substantially more rapidly than carbon dioxide.

The gas leaving the top of the plate column via line 64 contained about 20% of hydrogen sulfide and 16% of carbon dioxide. This gas contained the major portion of the sulfur of the solution treated and was reacted with air to form elemental sulfur in a system of so-called Claus type reactors 44.

The effluent solution contained sodium hydrogen carbonate and sodium carbonate and salts indifferent to the treatment while due to the treatment with substantially oxygen-free gas the thiosulfate content was very low, less than 2% of the total amount of $Na_2O$.

Example 3

Experiments were made in an industrial installation, producing 10 metric tons of sulfate pulp per hour cooked with a liquor containing 70 kg. of polysulfide sulfur per metric ton of pulp.

Figure 3:
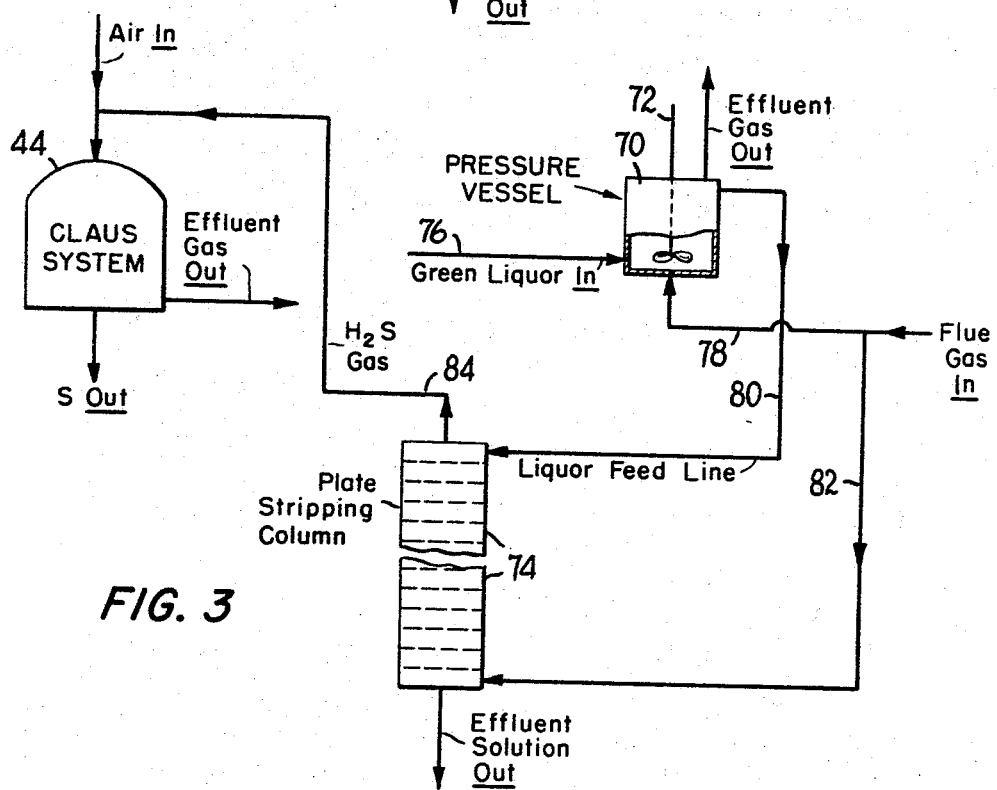
FIGURE 3 is a flow sheet of a third embodiment of the invention, as carried out in Example 3, and a description thereof will be found in that example.

A flow sheet showing the apparatus used in removing hydrogen sulfide from the green liquor and converting it to sulfur is given in FIGURE 3. For the reaction between the green liquor and flue gas, a pressure vessel 70 equipped with agitator 72 and having a capacity of 15 cubic meters and a plate column 74 having 30 plates and a diameter of 2.4 meters were used. Green liquor containing per liter 60 g. $Na_2O$ as sodium sulfide, 60 g. $Na_2O$ as sodium carbonate and 10 g. $Na_2O$ as other sodium salts, such as sulfate, chloride, thiosulfate etc., was supplied to the agitator vessel via line 76 at a rate of 0.4 cubic meter per minute. The green liquor had a temperature of 80° C. and had been treated in the usual manner to remove sludge therefrom. From a recovery furnace, wherein black liquor was burnt, a flue gas having a temperature of 200° C. was taken at a rate of 90 cubic meters per minute (based on dry gas at 760 mm. mercury and 0° C.). This flue gas contained initially 4% of oxygen, but by combustion of atomized oil therein with a limited supply of air, 1 liter of fuel oil No. 4 per 90 cubic meters of flue gas (dry gas at 760 mm. mercury and 0° C.) the oxygen content was lowered to below 1%, while the carbon dioxide content was increased to 20% and the nitrogen content was at 79%. The gas was then cooled and washed in a scrubber to remove spot and other solid particles before the gas was introduced into the agitator vessel via line 78 at a pressure of 1 kg. per sq. cm. above atmospheric.

The carbonated solution was transferred via line 80 to the top plate of the plate-column and treated therein with flue gas from a recovery furnace via line 82, which had been treated as above described to remove oxygen therefrom, this gas being supplied at a rate of 60 cubic meters per minute (calculated as dry gas at 760 mm. mercury and 0° C.).

From the agitator vessel 70, a gas was obtained which contained about 5% of carbon dioxide and practically no hydrogen sulfide, due to the alkaline liquor absorbing hydrogen sulfide substantially more rapidly than carbon dioxide.

From the top of the plate column, a gas was obtained which contained about 15% of hydrogen sulfide and 11% of carbon dioxide, said gas containing the major portion of the sulfur of the treated solution. This gas passed via line 84 to a system of Claus reactors 44 and was reacted with air to form elemental sulfur.

The effluent solution contained sodium hydrogen carbonate and sodium carbonate together with the salts indifferent to the treatment, while due to the treatment with substantially oxygen-free gases the thiosulfate content was very low, less than 2% of the total $Na_2O$.

I claim:

1. A method for preparing a polysulfide-containing cooking liquor for use in the sulfate method of preparing cellulose pulp, which comprises stripping hydrogen sulfide from a green liquor containing sodium sulfide and obtained from spent liquor produced in the sulfate pulping method, by introducing into the green liquor a gas containing a high proportion of carbon dioxide and less than 1% oxygen and selected from the group consisting of (a) flue gas obtained by kiln combustion of lime mud, and (b) black liquor combustion gas, forming a solution containing sodium carbonate and sodium bicarbonate, converting the hydrogen sulfide to sulfur by burning the hydrogen sulfide in the carbon dioxide-containing stripping gas mixture, separating the elemental sulfur from the carbon dioxide-containing combustion gas mixture and venting the carbon dioxide-containing combustion gas mixture to the atmosphere, converting the sulfur to sodium polysulfides, and using the sodium polysulfides to prepare a polysulfide-containing pulping liquor for the sulfate pulping method.

2. A method in accordance with claim 1 wherein the flue gas is obtained by incomplete combustion of lime mud in a lime furnace.

3. A method in accordance with claim 1 in which the carbon dioxide containing gas is introduced at a pressure within the range from about 0.1 to about 25 kg./sq. cm. above atmospheric.

4. A method in accordance with claim 1 in which the carbon dioxide-containing gas is obtained by combustion of black liquor and fuel oil in a deficiency of oxygen.

5. A method in accordance with claim 4 wherein the combustion is effected with fuel oil.

6. A method in accordance with claim 4, wherein the combustion is effected with oxidizable gas.

References Cited
UNITED STATES PATENTS

| | | | |
|---|---|---|---|
| 2,611,682 | 9/1952 | Mannbro | 23—181 |
| 2,675,297 | 4/1954 | Gray et al. | 23—181 X |
| 2,824,071 | 2/1958 | Gray et al. | 23—48 X |
| 2,849,292 | 8/1958 | Shick | 23—181 X |
| 2,864,669 | 12/1958 | Ahlborg et al. | 23—48 X |
| 3,005,686 | 10/1961 | De Haas | 23—49 X |
| 3,079,238 | 2/1963 | Handwerk | 23—181 X |
| 3,083,077 | 3/1963 | Bjorkman et al. | 23—48 |
| 3,250,591 | 5/1966 | Bergholm et al. | 23—48 |

OSCAR R. VERTIZ, *Primary Examiner.*

MILTON WEISSMAN, *Examiner.*

G. T. OZAKI, *Assistant Examiner.*